Nov. 11, 1930. J. C. ARMOR 1,781,360
METHOD OF PACKING WELDING RODS AND A BUNDLE FOR THE SAME
Filed Feb. 1, 1929
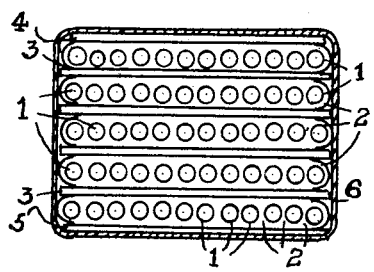
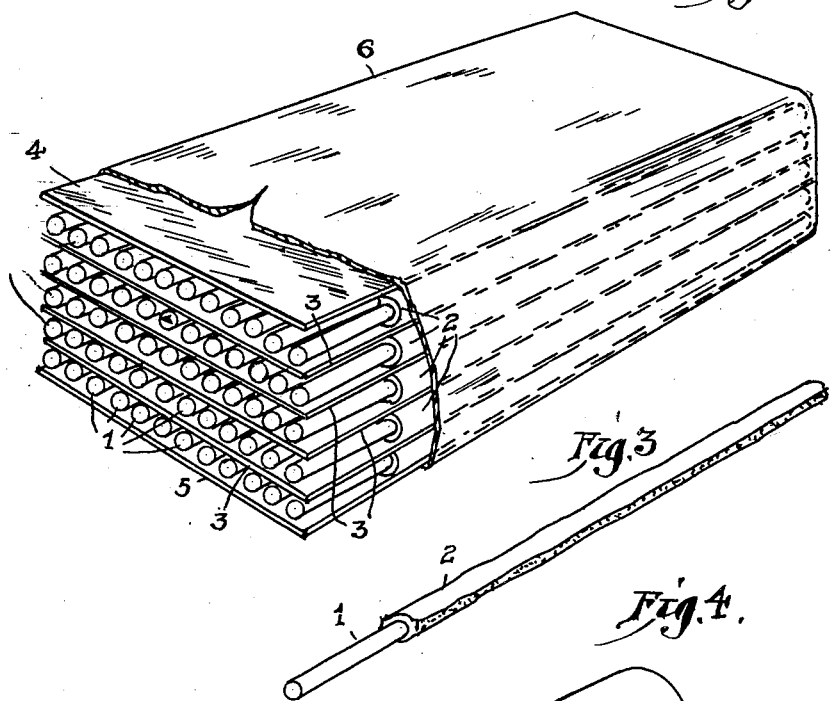
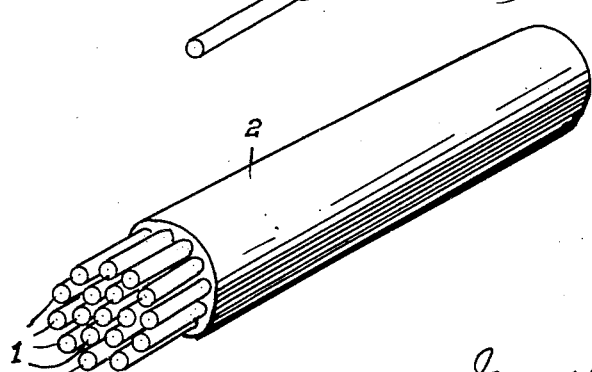
INVENTOR
James C. Armor,
by Edward A. Lawrence
his attorney.

Patented Nov. 11, 1930

1,781,360

UNITED STATES PATENT OFFICE

JAMES C. ARMOR, OF WEST VIEW, PENNSYLVANIA

METHOD OF PACKING WELDING RODS AND A BUNDLE FOR THE SAME

Application filed February 1, 1928. Serial No. 251,201.

Welding rods, which are used in electrical and also in acetylene welding, are frequently coated with a mixture of a flux, usually calcium carbonate or a silicious substance together with a suitable binder, such as water glass. According to the present practice, these coated rods are assembled in bundles for storage and shipment, and the relative movement between the rods composing the bundles tends to loosen the more or less friable flux coating causing it to drop off, so that when the rods are used they are found deficient in the amount of the required flux. Again after one or more of the rods are removed from the bundle the rest are so loosely held that they are likely to become scattered or further damaged.

One of the objects which I have in view is the provision of a novel bundle of welding rods which will prevent relative movement between the rods composing the bundle and thus obviate the abrasion of the flux coating from the individual rods.

Another object is to provide a bundle of such character that the rods remaining in the bundle, after one or more have been removed will not become loosened from each other until used.

In the accompanying drawings, wherein I have illustrated the best embodiment of the principles of my invention now known to me, Fig. 1 is an end view of a bundle of welding rods; Fig. 2 a perspective of the same; Fig. 3 a perspective of one of the rods removed from the bundle and separated from its fellows, and Fig. 4 a perspective of a modified form of the bundle.

Referring first to Figs. 1, 2 and 3, 1 represents the welding rods which are of the material required for welding purposes, such as steel.

Said rods are united together by the application of the mixture of flux and binder while the same is in fluid form, the rods being disposed side by side and the flux and binder mixture forming a connecting web 2 which coats the rods and connects them rigidly together when it is dry. The connected series of rods thus form flat layers which are then stacked one on the other as shown in Figs. 1 and 2 with interposed strips of protective material such as cardboard 3, and with similar cardboard strips 4 and 5 at the top and bottom of the stack. A paper enclosure 6 is then wrapped around the stack and the bundle is ready for storage and shipment.

When the rods are to be used, one of the layers is slid lengthwise from the bundle or the paper envelope is torn off and a layer lifted out. A rod is then broken off the layer, fracturing the connecting web, bringing with it its proportionate part of the flux web. One end of the rod is preferably left bare of flux so that the rod may be inserted into a suitable holder in the usual manner.

In Fig. 4 I show the rods formed into a round bundle cemented together and surrounded by the flux, the rods being torn from the bundle as required.

It is obvious that the flux-coated surfaces of adjacent rods are thus prevented from relative movement and thus the abrading effect on the more or less friable flux is avoided, and therefore the rods are in proper condition when the welding operation is accomplished.

What I desire to claim is:—

1. The method of forming welding rods, which are coated with flux and a binder, into packages for storage and shipment, which comprises arranging the rods together in layers while the flux and binder are still plastic and allowing the flux and binder to dry so that the rods are cemented together, and forming a bundle of said layers by stacking the same with strips of protective material interposed between the layers to secure the stacked layers together.

2. The method of forming welding rods, which are coated with flux and a binder, into packages for storage and shipment, which comprises arranging the rods together in layers while the flux and binder are still plastic and allowing the flux and binder to dry so that the rods are cemented together, and securing the stacked layers in an outer protective cover to hold them together.

Signed at Pittsburgh, Pa., this 30th day of January, 1928.

JAMES C. ARMOR.